P. ESCH.
METHOD OF MAKING U-SHAPED PIPE BENDS.
APPLICATION FILED FEB. 12, 1910.
984,652.
Patented Feb. 21, 1911.
2 SHEETS—SHEET 1.
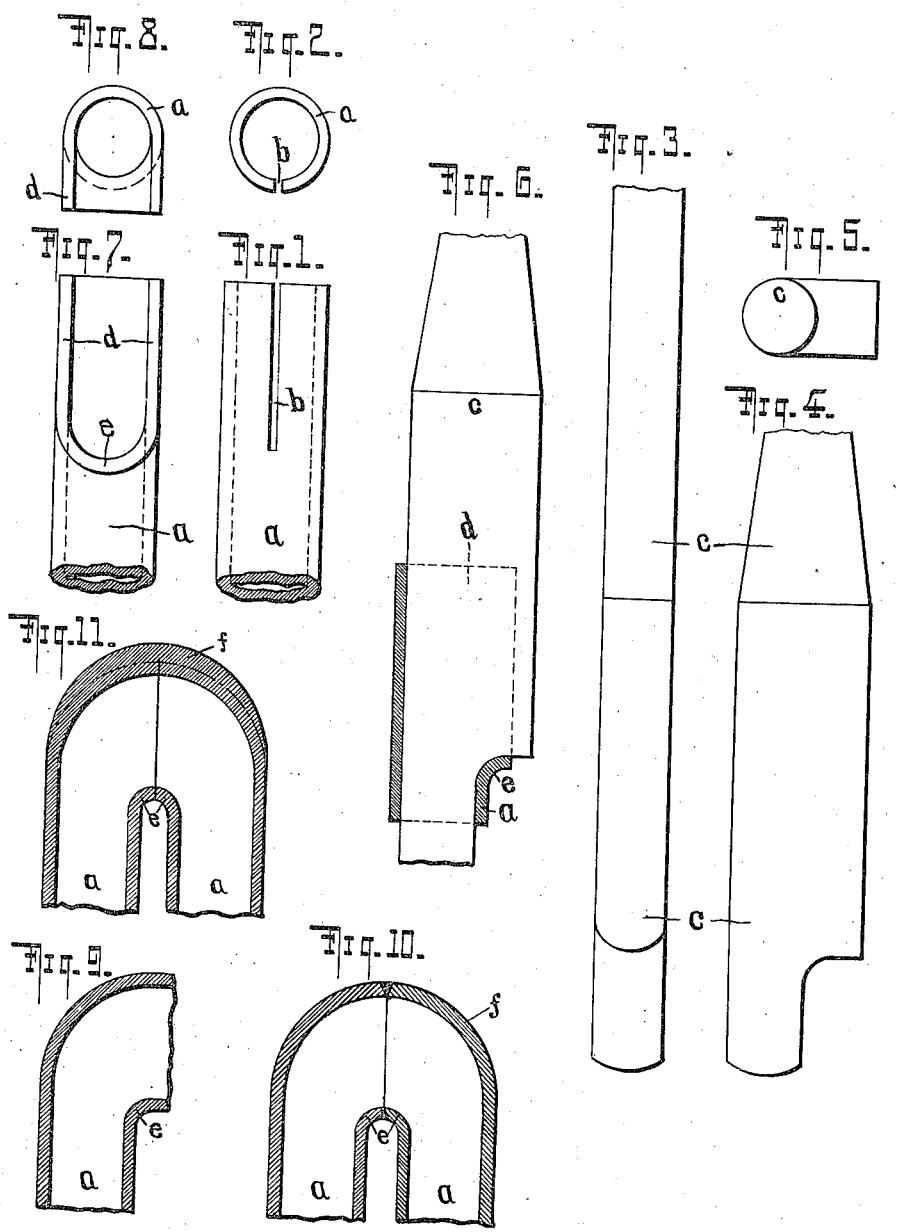
WITNESSES:
INVENTOR
PETER ESCH
BY
ATTORNEYS

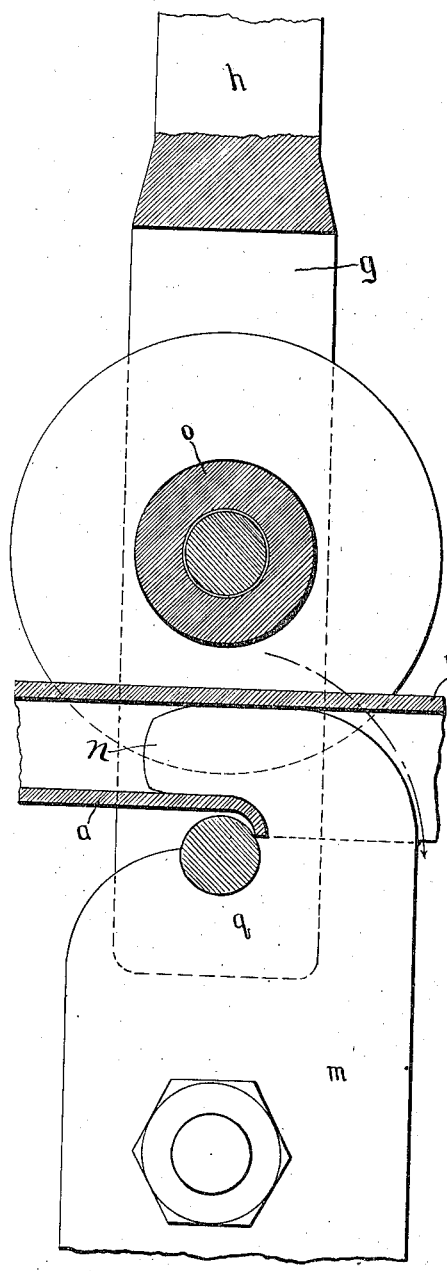
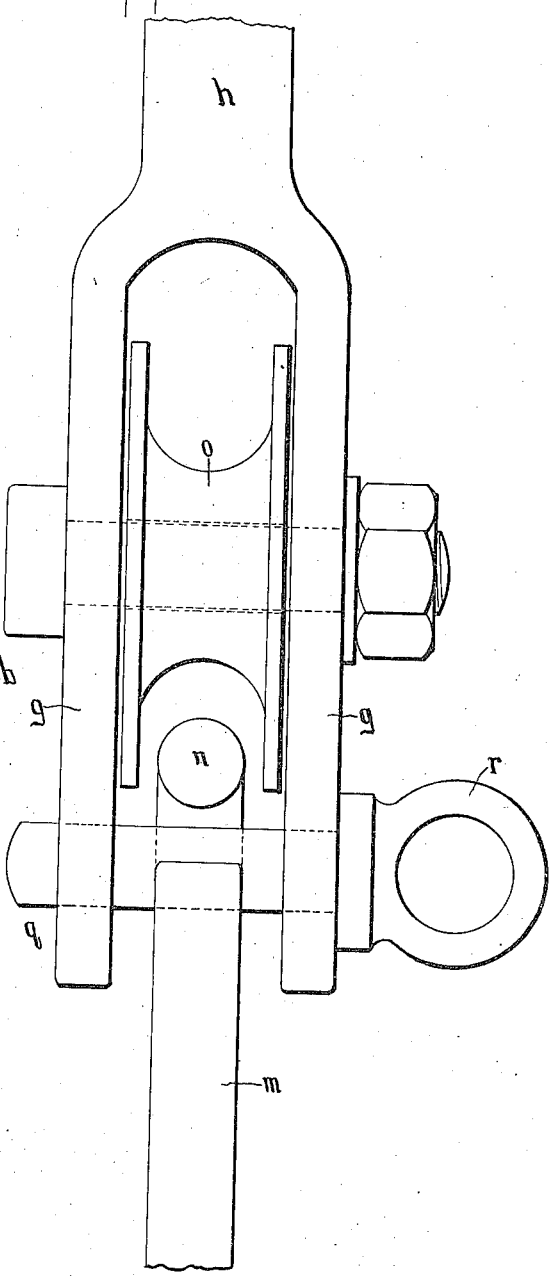

UNITED STATES PATENT OFFICE.

PETER ESCH, OF DUSSELDORF, GERMANY, ASSIGNOR, BY MESNE ASSIGNMENTS, TO LOCOMOTIVE SUPERHEATER COMPANY, OF NEW YORK, N. Y., A CORPORATION OF NEW JERSEY.

METHOD OF MAKING U-SHAPED PIPE-BENDS.

984,652. Specification of Letters Patent. Patented Feb. 21, 1911.

Application filed February 12, 1910. Serial No. 543,558.

*To all whom it may concern:*

Be it known that I, PETER ESCH, a subject of the German Emperor, residing at Dusseldorf, Germany, have invented a new and useful Improvement in Methods of Making U-Shaped Pipe-Bends, of which the following is a specification.

My invention concerns the making of U-shaped pipe bends and particularly such bends when used in connection with boilers, superheaters and generally when exposed to high temperatures or to carry steam or fluids under pressure.

My invention relates particularly to making of such bends as aforesaid when the two legs of the bend are required to be very close together.

Various ways of making bends of the above character for similar purposes have been proposed, but all are attended by certain disadvantages which it is the purpose of my invention to obviate.

In one well-known method of making U-shaped pipe bends, the individual tubes which are to form the legs of the bend, are cut off at an angle; the cut ends are then individually shaped up and welded together. A principal disadvantage of this method, as also of a number of other methods which have been employed, resides in the difficulty of so shaping the individual bent ends of the two tubes that they will have the same identical shape and area of cross section; without such identity it is obviously impossible to make a strong and durable joint.

A primary object of my invention herein described is to enable each individual pipe to be brought accurately and exactly to a certain predetermined shape so that two ends, when placed together, will abut properly and with precision.

A further and most important object of the invention is to enable said ends to be shaped as specified without stretching the metal at any point; the pipe walls at the bend are therefore of the same thickness after shaping as before.

A still further object of my invention is to provide a method of manufacturing bends of the desirable character described, which method is simple, quick and inexpensive in its operation.

Speaking generally, the process consists in taking the separate straight legs which are to be united by a U-shaped bend, and slitting an end of each pipe for a certain distance along one side; this slitted portion is then opened up and drifted out to have a U-shaped cross section after which said section is rounded into shape. The process is completed by abutting the two half bends, thus formed, and welding them together.

The bend is strengthened if desired by welding a certain amount of iron in the form of sheet or otherwise upon the outside of the bend.

Referring to the drawings which accompany this specification and which embody a preferred form of pipe bend, as made by my method, Figs. 1 and 2 represent respectively an elevation and a plan of a slitted pipe end; Figs. 3, 4 and 5 represent respectively an edge elevation, a side elevation and a plan of a suitable drift for carrying out my method. Fig. 6 is an elevation showing the drift inserted in the slit tube end; Figs. 7 and 8 represent respectively an elevation and a plan of the tube end, after the drift, as shown in Fig. 6, has been removed; Fig. 9 represents a central section of the tube end after it has been rounded; Fig. 10 shows two slitted tube ends after they have been drifted and rounded, abutted and welded together; Fig. 11 is a view similar to Fig. 10, but representing a strengthening band of iron welded upon the outside of the bend; and Figs. 12 and 13 represent respectively a side elevation and an edge elevation, the first partly in section, of a device for rounding the tube end as required for one step of my method.

The several drawings have the same reference letters applied to corresponding parts and are necessarily of a somewhat diagrammatic character.

Taking up the drawings in detail, tube $a$ is first slit by any suitable means parallel to the axis and along one wall as shown at $b$ (Figs. 1 and 2), a drift $c$ as shown in Figs. 3, 4 and 5 is then forced into the slitted pipe ends opening up the two sides of the slit as it goes, until the end has the form shown in Figs. 6, 7 and 8; the original circular cross section of the tube end is now converted into a U-shaped section while at the same time the wall at the bottom of the slit is concaved and rounded as at $e$. The next step consists in rounding or bending over in the plane of the required finished bend, the part d now of U-shaped section, so that the tube shall have the form shown in Fig. 9. This step having been accomplished the end of each half bend is then squared off and the edge preferably beveled. The final step consists in taking two legs with their ends prepared as just described, placing said ends together and holding them in such position, while welding together, by any suitable method, for example, by the well-known autogenous method, with the help of the usual wire or rod of welding iron. An added step which may or may not be used, and the desirability of which depends upon the character of the work for which the bend is to be used, is the welding in position of the outside of the bend by a mass of iron as at f, Fig. 11.

Figs. 12 and 13 illustrate a mechanical device by means of which the rounding and bending of the U-shaped section as above described is very simply, quickly and accurately accomplished. In this device, a die m fixed to any convenient support is provided with a hook-like nose n having about the same cross section as that of the original tube. In the body of this die a rest is provided for the reception of a pin q, provided with a handle r. This pin q serves as a support for the bend e of the tube, formed as it leaves the drift, and also as a pivot for a forked jaw g, within which is a rotatably mounted roller o having a groove shaped to agree with the section of the tube. The forked jaw g is provided with a handle h. When using this shaping die, the previously drifted tube is fitted over the nose n while the jaw g and roller o is placed over the outside of the pipe, and pin q inserted. By now rotating the jaw in the direction of the arrow, Fig. 12, by means of a handle h, the outer U-shaped cross section of the pipe end is rolled and rounded over the corresponding part of the die m and the pipe a is given a shape shown in Fig. 9. The nose n must be accurately shaped so that the roller o will press the tube wall tightly against it during its operation.

It is clear that the joint between the two legs of the U-shaped bend need not necessarily be symmetrically disposed as shown in Fig. 10, but this disposition is generally preferable.

A great advantage of the herein described method of making U-shaped bends is that the legs of the bend may be brought as closely together as is desired, while on the other hand, they may be separated to any desired limit.

The method may be applied to tubes having walls whose thickness is considerable. The method of manufacture is equally suitable to application where two legs of the U are or are not parallel and even if they lie in different planes.

While I have described one form of U-shaped bend and one arrangement of apparatus for carrying out my improved method, it is obvious that many variations can be made in both without departing from the spirit of the invention which I have embodied in the following claims.

I claim as my invention:

1. The method of making U-bends which consists in slitting an end of each leg, spreading the walls on each side of the slit until said end has a U-shaped section, then rounding the U-section into the shape of a half bend, and finally joining the two ends, as and for the purpose described.

2. The method of making U-bends which consists in slitting an end of each tube, spreading the walls on each side of the slit until each end has a U-shaped section and concaving the tube wall at the bottom of the slit, rounding the U-section into the shape of a half bend, and finally welding the two ends together, as and for the purpose described.

3. The method of making U-bends which consists in slitting an end of each tube, spreading the walls on each side of the slit until each end has a U shaped section while concaving the tube wall at the bottom of the slit and bending it outwardly, then rounding the U section into the shape of a half bend, and finally welding the two ends together, as and for the purpose described.

4. The method of making U-bends which consists of slitting an end of each tube, spreading the walls on each side of the slit until each end has a U-shaped section while concaving the tube wall at the bottom of the slit and bending it outwardly, then rounding the U section into the shape of a half bend, squaring off the end and beveling the edge of the same, and finally welding the two ends together, as and for the purpose described.

In testimony whereof I have hereunto set my hand in the presence of two subscribing witnesses.

PETER ESCH.

Witnesses:
 LOUIS VANDORY,
 JOSEF WEINGARTEN.